Patented Jan. 8, 1952

2,582,194

UNITED STATES PATENT OFFICE 2,582,194

ANION EXCHANGE RESINS WHICH ARE POLYAMINE - POLYACRYLATE REACTION PRODUCTS

James R. Dudley, Cos Cob, Conn., assignor to American Cyanamid Company, New York, N. Y., a corporation of Maine No Drawing. Application February 19, 1946, Serial No. 648,818

1 Claim. (Cl. 260—78)

This invention relates to synthetic resinous materials and their preparation and more particularly, to those resinous materials suitable for the removal of anions from liquid media and to processes of purifying liquid media by means of the resins.

It is an object of the present invention to prepare a resin from a polyamine and either polyacrylic acid or a polymerized ester of acrylic acid.

It is an other object of the present invention to prepare an anion active resin from a polyalkylene polyamine and either polyacrylic acid or a polymerized ester of acrylic acid.

A further object of the present invention is to provide a resinous material which is insoluble in water and which is suitable for removing anions from water and other liquid media.

Still another object of the present invention is to provide a process for producing new synthetic resinous materials, and more particularly to provide a process for producing resinous materials, suitable for the removal of anions from liquid media.

These and other objects are attained by condensing a polyamine with polyacrylic acid or with a polymerized ester of acrylic acid, preferably in a molar ratio of from 1.3:1 to 1.6:1, acrylic acid content of polyacrylic compound to polyamine.

It is still another object of the present invention to provide an improved process for removing anions from water and other liquid media.

This and other objects of the present invention are attained by contacting a liquid containing anions with a water-insoluble granular resin of the type prepared in the manner described above.

The invention will be described in greater detail in conjunction with the following specific examples which are merely illustrative and not intended to restrict the scope of the invention to the specific details therein set forth. Proportions are given in parts by weight unless otherwise indicated.

EXAMPLE 1

24 parts of 83.2% acrylic acid (0.28 mol)
200 parts of water
4.4 parts of 30% aqueous hydrogen peroxide
26 parts of tetraethylenepentamine (0.14 mol)

A dilute solution of polyacrylic acid is prepared by dissolving the acrylic acid and the hydrogen peroxide in the water and heating for 45 minutes at 90° C. The polyacrylic acid solution obtained is cooled, and the tetraethylenepentamine is mixed therewith. A gelatinous salt is precipitated, and the reaction mixture is heated with agitation until a complete solution is obtained. The viscous syrup obtained is cured at 165° C. for 12–16 hours and the tan, hard, brittle resin obtained found, upon evaluation, to have a capacity for 4.9 kilograins of calcium carbonate per cubic foot of resin and a density of 19.8 lbs./cu. ft.

EXAMPLE 2

26.0 parts of 83.2% acrylic acid (0.3 mol)
225 parts of water
5.6 parts of 30% aqueous hydrogen peroxide
37.8 parts of tetraethylenepentamine (0.2 mol)
50 parts of water Polyacrylic acid is prepared as described in Example 1. A solution of the tetraethylenepentamine in water is added to the hot polyacrylic acid, and the precipitate formed is less abundant and easier to dissolve than that of Example 1. After the precipitate is completely dissolved, the viscous syrup is cured for 15 hours at 165° C. and the light brown, hard, brittle resin has a capacity of 17.3 kilograins of calcium carbonate per cubic foot of resin and a density of 18.6 lbs./cu. ft.

The same resin evaluated in a hot cell at 70° C. has a capacity of 29.5 kilograins of calcium carbonate per cubic foot of resin and if, after evaluation in the hot cell, the same sample is again evaluated at room temperature, the capacity is 20.4 kilograins of calcium carbonate per cubic foot of resin with a density of 27.2 lbs./cu. ft.

EXAMPLE 3

20.8 parts of 83.2% acrylic acid (0.24 mol)
180 parts of water
5.6 parts of 30% aqueous hydrogen peroxide
37.8 parts of tetraethylenepentamine (0.2 mol)
50 parts of water The procedure of Example 2 is followed except that the viscous syrup is cured for 16 hours. The brown, hard, brittle resin obtained has a capacity of 8.0 kilograins of calcium carbonate per cubic foot of resin and a density of 7.9 lbs./cu. ft.

EXAMPLE 4

17.3 parts of 83.2% acrylic acid (0.2 mol)
150 parts of water
5.6 parts of 30% aqueous hydrogen peroxide
37.8 parts of tetraethylenepentamine (0.2 mol)
50 parts of water The procedure of Example 2 is followed except that as in Example 3 the viscous syrup is cured for 16 hours. The brown, hard, brittle, but somewhat tacky resin has a capacity of 7.0 kilograins of calcium carbonate per cubic foot of resin and a density of 8.7 lbs./cu. ft.

EXAMPLE 5

366 parts of 7.86% polyacrylic acid (0.4 mol as acrylic acid)
75.6 parts of tetraethylenepentamine (0.4 mol)
100 parts of water The polyacrylic acid solution is heated by means of steam to 90–95° C. A solution of the polyamine in the water is warmed, and quickly poured into the hot polyacrylic acid solution. Considerable gelatinous precipitation occurs if the reaction mixture is not stirred vigorously and if the amine is not added quickly enough to the acid solution. The reaction mixture is heated with steam until all effervescence ceases, the gelatinous precipitate dissolves, and a clear solution is obtained. This may take from 1½–2 hours.

The viscous syrup is cured for 16 hours at 130–165° C. and, after suitable grinding, the cured resin has a capacity for removing anions from solution equivalent to 9.4 kilograins of calcium carbonate per cubic foot of resin and a density of 7.8 lbs./cu. ft.

If a portion of the resin of 20–40 mesh particle size is cured an additional 7 hours at 165–170° C., the capacity drops to 7.4 kilograins of calcium carbonate per cubic foot of resin while the density increases to 13.2 lbs./cu. ft.

EXAMPLE 6

439 parts of polyacrylic acid (0.48 mol as acrylic acid)
75.6 parts of tetraethylenepentamine (0.4 mol)
100 parts of water The procedure of Example 5 is repeated. The capacities with and without the additional high temperature cure are 11.2 and 8.2 kilograins of calcium carbonate per cubic foot of resin, respectively, and the densities 7.2 and 14.9 lbs./cu. ft., respectively.

EXAMPLE 7

513 parts of polyacrylic acid (0.56 mol as acrylic acid)
75.6 parts of tetraethylenepentamine (0.4 mol)
100 parts of water The procedure of Example 5 is followed and the resin obtained found to have capacities of 15.0 and 12.1 kilograins of calcium carbonate per cubic foot of resin and densities of 10.2 and 16.2 lbs./cu. ft.

EXAMPLE 8

586 parts of polyacrylic acid (0.64 mol as acrylic acid)
75.6 parts of tetraethylenepentamine (0.4 mol)
100 parts of water The procedure of Example 5 is followed, and the resin obtained has capacities of 12.0 and 4.4 kilograins of calcium carbonate per cubic foot of resin and densities of 20.8 and 21.6 lbs./cu. ft., respectively.

EXAMPLE 9

658 parts of polyacrylic acid (0.72 mol as acrylic acid)
75.6 parts of tetraethylenepentamine (0.4 mol)
100 parts of water The procedure of Example 5 is followed and the capacities of the resin obtained found to be 13.3 and 4.7 kilograins of calcium carbonate per cubic foot of resin, respectively. The corresponding densities of this resin are 18.9 and 19.2 lbs./cu. ft.

EXAMPLE 10

732 parts of polyacrylic acid (0.8 mol as acrylic acid)
75.6 parts of tetraethylenepentamine (0.4 mol)
100 parts of water The procedure of Example 5 is followed, and the resin obtained has capacities of 6.0 and 3.9 kilograins of calcium carbonate per cubic foot of resin and densities of 23.8 and 22.6 lbs./cu. ft., respectively.

EXAMPLE 11

714 parts of 7.86% polyacrylic acid (0.78 mol as acrylic acid)
113.5 parts of tetraethylenepentamine (0.6 mol)
222 parts of water The polyacrylic acid solution is placed in a reaction vessel equipped with mechanical agitating means, a reflux condenser and a thermometer, and it is heated with steam to about 95° C. A warm solution of the tetraethylenepentamine is added quickly to the hot polyacrylic acid solution, and a gelatinous precipitate and considerable effervescence may be observed. However, a clear dark brown solution is obtained after about 15–20 minutes of continued heating by steam. The resin syrup which contains 16.2% solids concentration of the amine salt is cured for 12 hours at 170° C. The resin has a capacity of 12.2 kilograins of calcium carbonate per cubic foot of resin and a density of 10.8 lbs./cu. ft. Additional hours of cure lowered the capacity somewhat and increased the density.

EXAMPLE 12

769 parts of 7.86% polyacrylic acid (0.84 mol as acrylic acid)
113.5 parts of tetraethylenepentamine (0.6 mol)
191 parts of water The procedure of Example 11 is followed, and the resin obtained has a capacity of 14.6 kilograins of calcium carbonate per cubic foot of resin and a density of 10.7 lbs./cu. ft. In this case, additional hours of cure at 170° C. increases the capacity as well as the density of the resin. Moreover, a portion of resin which has had an additional 8 hours of cure at 170° C. is evaluated in a hot cell at 170° C. and found to have a capacity of 23.4 kilograins of calcium carbonate per cubic foot of resin and a density of 18.2 lbs./cu. ft.

EXAMPLE 13

755 parts of 7.86% polyacrylic acid (0.83 mol as acrylic acid)
104 parts of tetraethylenepentamine (0.55 mol)
155 parts of water The procedure of Example 11 is followed except that the viscous syrup is cured for an additional 2 hours at 170° C. The capacity of the resin obtained is 13.2 kilograins of calcium carbonate per cubic foot of resin and the density, 11.6 lbs./cu. ft. Additional hours of cure at 170° C. has little effect on the capacity but does increase the density to about 17.2 lbs./cu.ft.

EXAMPLE 14

805 parts of 7.86% polyacrylic acid (0.88 mol as acrylic acid)

104 parts of tetraethylenepentamine (0.55 mol)
125 parts of water

The procedure of Example 11 is followed. The resin obtained has a capacity of 9.1 kilograins of calcium carbonate per cubic foot of resin and a density of 13.4 lbs./cu. ft. Additional hours of cure at 170° C. increase both the capacity and the density.

EXAMPLE 15

1000 parts of 7.84% aqueous polyacrylic acid (1.9 mols of acrylic acid)
147 parts of tetraethylenepentamine (0.78 mol)
243 parts of water The polyacrylic acid solution is heated to 95° C., and a solution of the polyamine in the water is added. The reaction is exothermic, causing the reaction temperature to reach 103° C. A considerable quantity of gas is liberated, and a gummy precipitate forms which dissolves with continued heating. The syrup is concentrated at reduced pressure from a weight of 1390 parts to 449 parts so that the solids concentration of the resin syrup is apparently about 50%.

The resin is cured for 3 to 6 hours at 200° C. The capacity of the resin is 21.3 kilograins of calcium carbonate per cubic foot of resin and the density is 15.5 lbs./cu. ft.

EXAMPLE 16

113 parts of polyethyl acrylate (1.13 mols)
142 parts of tetraethylenepentamine (0.75 mol)
790 parts of benzene The polyethyl acrylate is dissolved slowly in the benzene which is maintained at a reflux, and the tetraethylenepentamine is added thereto. The syrup is heated for 15.5 hours at 95° C. in order to drive off the benzene and then three separate portions of the resin are cured for 4 hours at 160° C., 6 hours at 160–165° C., and 8 hours at 165° C., respectively. The capacities of these three portions are 7.8, 9.5 and 6.0 kilograins of calcium carbonate per cubic foot of resin, respectively, and the corresponding densities are 13.9, 18.6 and 18.9 lbs./cu. ft.

Preparation of polyacrylic acid 465 parts (5.0 mols) of 77% acrylic acid is placed in a vessel equipped with means for mechanical agitation, a reflux condenser and a thermometer. 4000 parts of water and 139 parts of 30% aqueous hydrogen peroxide are added to the acrylic acid in the reaction vessel, and the mixture is heated with steam at 95–100° C. for one hour. The reaction is exothermic at first, causing a general refluxing for 15 minutes, and after heating for an hour the viscosity of the solution increases. The resulting solution is cooled to about 50° C.

Tetraethylenepentamine has been used in each of the preceding specific examples because it is suitable, readily available, and not expensive. Other polyamines may be substituted for part or all of the tetraethylenepentamine. Furthermore, mixtures of two, three, five or any other number of polyamines may be employed.

Examples of suitable polyalkylene polyamines include diethylene triamine, triethylene tetramine, tetraethylene pentamine, pentaethylene hexamine, polymerized ethyleneimine, di-3-amino propylamine, and all of the higher homologues containing additional — $CH_2CH_2NH$ — groups in the chain between the primary amino groups. Complex mixtures of polyethylene polyamines of high molecular weight obtained by the addition of large numbers of molecules of ammonia to ethylene dibromide or ethylene dichloride and the like, may be used.

Heterocyclic and aromatic polyamines may also be used in the preparation of the resinous materials of the present invention as may other type aliphatic polyamines such as ethylene diamine, 1,3-diamino propane, 1,3-diamino propanol-2, hexamethylene diamine, etc.

Similarly, the invention is in no sense limited to the use of polymerized ethyl acrylate. Polymers of other alkyl esters of acrylic acid such as methyl, propyl, n-butyl, isobutyl, hexyl, octyl, 2-ethylhexyl, lauryl, etc. may be substituted for the polyethyl acrylate of Example 16.

The particular method of preparation of the polymeric acrylic acid and acrylic acid esters is not critical, and it is not necessary that the monomers be polymerized according to the method set out above. It is preferred that the acrylic acid or esters thereof be polymerized rapidly since it has been found that such polymers form more soluble salts with the polyacrylic polyamine due, apparently, to the fact that rapid polymerization gives smaller units of the polymerized compounds.

I have found that the molar proportions of the acrylic acid content of the polymeric acrylic compound to the polyamine should preferably fall within the range of 1.3:1 to 1.6:1. Within this range I further prefer a molar ratio of about 1.4:1 since, under these circumstances, anion exchange resins of higher capacities may be obtained.

Rather extreme curing conditions are required by the resins of the present invention. At temperatures of about 165°–170° C., a long period of curing i. e., from about 16–20 hours, is required. This is due at least in part to the relatively high dilution of the resin syrups, about 16% solids, so that during part of the curing period the resin is merely being dehydrated or, more generally, solvent is being driven off from the resin. If the resin syrup is concentrated to a solids content of about 50% and the temperature is raised to about 200° C., only about 4½ hours cure is necessary.

In general, the resins obtained by condensation of polyacrylic acid with a polyalkylene polyamine have moderate to good capacities for removing anions from solution. The corresponding resins prepared from the polyacrylates have, in general, lower capacities. Processing of a liquid containing anions which has been heated to about 70° C. results in more efficient utilization of the resins due to their considerably increased capacities, see Examples 2 and 12.

Although the resins of my invention will swell to a certain extent in water and tend to break down into smaller particles, this tendency decreases as the curing temperature increases. It is obvious, of course, that the curing temperature cannot be increased to too great an extent or else the formation of piperazine rings from the polyamine will occur.

While I do not wish to be limited to any particular theory of mechanism of the reaction of the present invention, I believe that fundamentally the formation of amide type linkages is involved. When the polyamine and the polymeric acrylic acid derivative are condensed, water or alcohol splits off at elevated temperatures to form an insoluble three-dimensional resin. If the number of amino radicals exceeds the number of carboxylic groups in the acrylate molecule, the resin obtained is suitable for the removal of anions from solution because the excess amino groups impart basic characteristics to the resin.

A temperature of about 165° C. should be sufficiently high to bring about conversion of the polyamine salt of the polyacrylic compound into the corresponding amide by loss of water or alcohol. However, the concentration of the amine salt in the resin solutions is usually quite low and therefore in order to form a cross-linked resin, excess solvent has to be removed before a sufficiently high temperature can be obtained to form an amide link. The solvent may be removed by concentration at reduced pressure or it may be removed in the curing ovens. As has been pointed out above, it is this necessity for removing solvent that is responsible for the length of the curing period.

The anion active resins may be activated or regenerated after exhaustion by means of dilute alkaline solutions such as for example, 0.1 to 10% aqueous solutions of sodium hydroxide, sodium carbonate etc.

The resinous materials produced in accordance with this invention are suitable for the removal of all kinds of acids and anions in general from liquid media, and for the exchange of all such anions in liquid media. They may be used to extract the strong mineral acids (preferably in relatively low concentrations) and organic acids such as acetic acid, oxalic acid, etc., from water. The anions of solids such as the chloride anion of ammonium chloride and the sulphate anion of ammonium sulphate may be removed by means of the resinous products described herein.

The anion active resins are useful for many purposes. Some of these uses are the removal of acid from water, the removal of acid from alcoholic solution, the purification of aqueous solutions containing sugar including sugar juices, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as media for growing plants or as a means for applying nutrients to the soil.

To be sufficiently insoluble for practical use in the water purification art, resins should have a sufficiently low solubility that they will not be dissolved rapidly by the solution to be treated. Thus water should not dissolve more than one part of resin in 1000 parts of water when passed through a bed of resin after the first cycle comprising an activation, and exhaustion, and a reactivation of the resin.

It is preferable to grind and screen the resins to a particle size of from about 8-60 mesh. Use of larger particles causes channeling and smaller particles of resins have been found to pack, thus reducing the anion exchange efficiency of material.

I claim:

A process of preparing a granular, resinous material of such low water solubility that 1,000 parts of water will not dissolve more than one part of resinous material when passed through a bed of resinous material after the first cycle comprising an activation, exhaustion, and reactivation which includes the steps of heating in water solution a mixture of polymerized acrylic acid and tetraethylene pentamine in a molar ratio of 1.5:1 based on the acrylic acid content of the polymer until a viscous syrup is obtained, heating said viscous syrup at a temperature of 165-170° C. for a period about 15 hours to obtain a hard, brittle resin, and granulating said hard, brittle resin.

JAMES R. DUDLEY.

REFERENCES CITED

The following references are of record in the file of this patent:

UNITED STATES PATENTS

| Number | Name | Date |
|---|---|---|
| 2,146,209 | Graves | Feb. 7, 1939 |
| 2,146,210 | Graves | Feb. 7, 1939 |
| 2,259,169 | Little | Oct. 14, 1941 |
| 2,304,637 | Hardy | Dec. 8, 1942 |
| 2,340,110 | D'Alelio | Jan. 25, 1944 |
| 2,340,111 | D'Alelio | Jan. 25, 1944 |
| 2,356,151 | Eastes | Aug. 22, 1944 |
| 2,366,008 | D'Alelio | Dec. 26, 1944 |